March 27, 1951  J. B. MUDGWAY  2,546,864
SKIVING DEVICE FOR USE IN HEEL ASSEMBLING
Filed Nov. 18, 1950  3 Sheets-Sheet 1

INVENTOR
JAMES B. MUDGWAY
BY
Haseltine, Lake & Co.
AGENTS

March 27, 1951 J. B. MUDGWAY 2,546,864
SKIVING DEVICE FOR USE IN HEEL ASSEMBLING
Filed Nov. 18, 1950 3 Sheets-Sheet 2
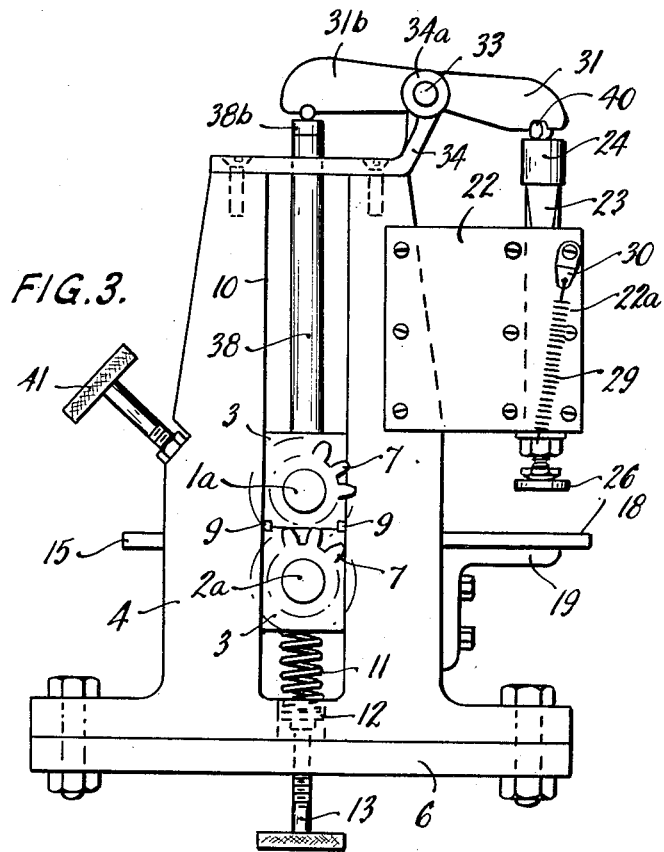
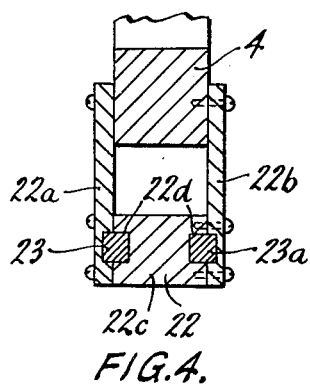
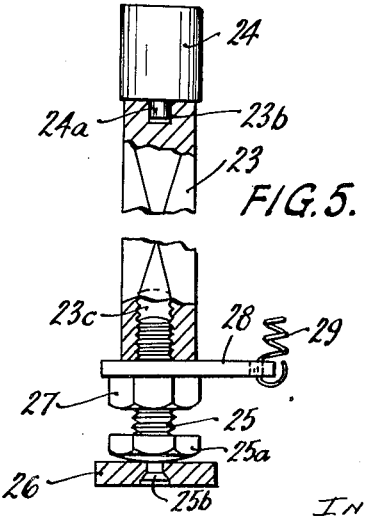
INVENTOR
James B. Mudgway
By: Haseltine, Lake & Co.
AGENTS March 27, 1951  J. B. MUDGWAY  2,546,864

SKIVING DEVICE FOR USE IN HEEL ASSEMBLING

Filed Nov. 18, 1950  3 Sheets-Sheet 3

INVENTOR
JAMES B. MUDGWAY
By:
Haseltine, Lake & Co.
AGENTS

Patented Mar. 27, 1951

2,546,864

UNITED STATES PATENT OFFICE 2,546,864

SKIVING DEVICE FOR USE IN HEEL ASSEMBLING

James Brackenridge Mudgway, Auckland, New Zealand

Application November 18, 1950, Serial No. 196,461
In New Zealand November 23, 1949

11 Claims. (Cl. 69—13)

This invention relates to heel building apparatus used in the manufacture of heels for boots, shoes and the like, the objects of the present invention being the provision of an automatic machine adapted to be set to any desired gauged thickness of the heels to be produced and by operation thereof to quickly and substantially accurately produce the heels to such gauged thickness.

In so far as I am aware, there is no known machine for achieving the objects of the present invention, the present known operation of heel manufacture being entirely manual, a man placing several layers together and exchanging various thicknesses until the desired gauged thickness is obtained, a hand gauge set to the required thickness being used for such gauging.

My invention has been devised to speed up this step in the manufacture of heels, it possibly not being realised that shoe manufacturers require heels to be substantially accurately and consistently produced of a thickness of (for example) three quarters of an inch.

Broadly the invention comprises automatic heel building apparatus comprising a pair of rollers with drive means for rotating same, frame means with movable bearings therein for rotatably carrying such rollers, knife means mounted at one side of the pair of rollers, gauging platform and table means, spring means for yieldingly forcing one roller towards the other, a pair of plungers slidably movable towards and away from the gauging platform and table means and mounted in plunger bracket means, means for yieldingly holding the plungers away from said gauging platform and table means and means between the other roller and the plungers whereby movements of opposite ends of such roller are imparted to the plungers.

Figure 1:
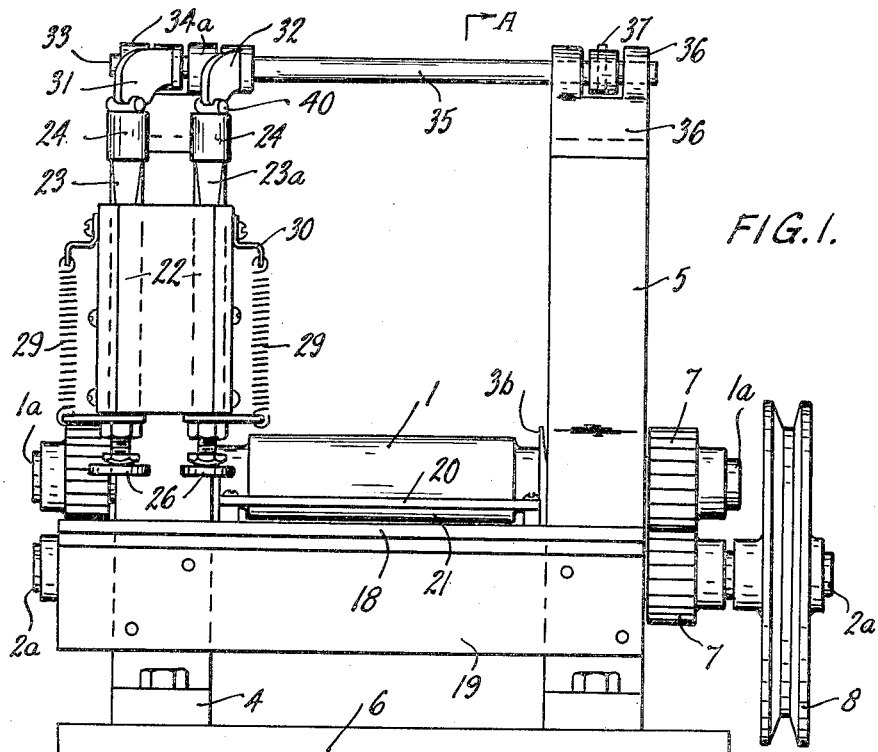
Figure 2:
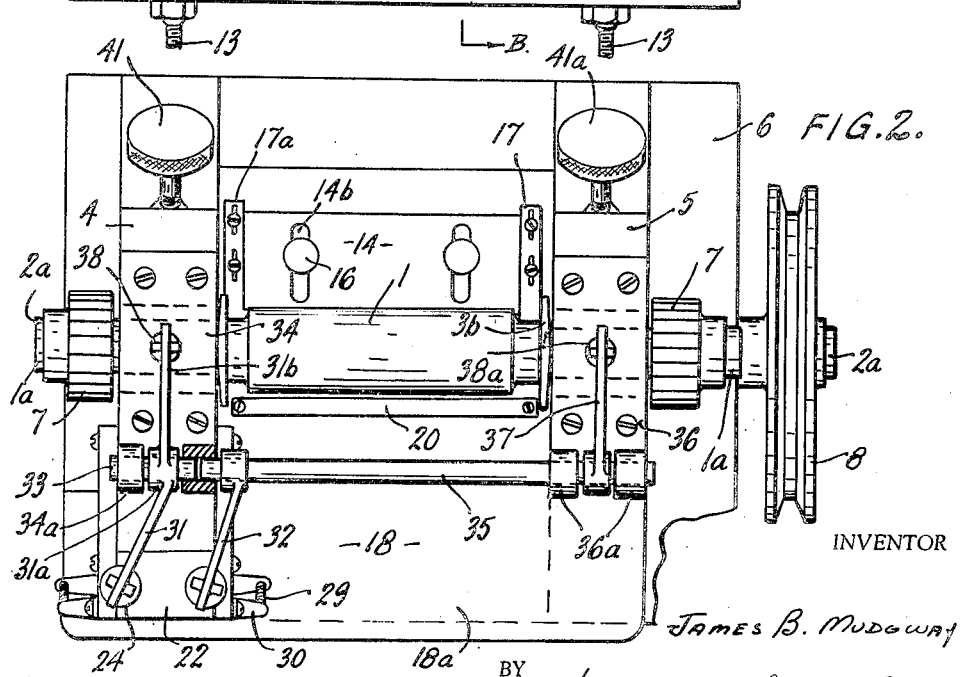
Figure 6:
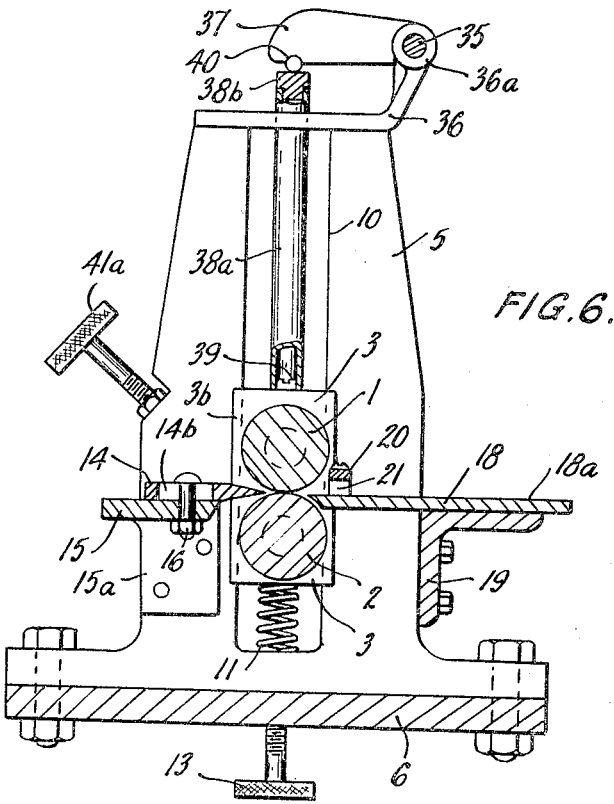
Figure 7:
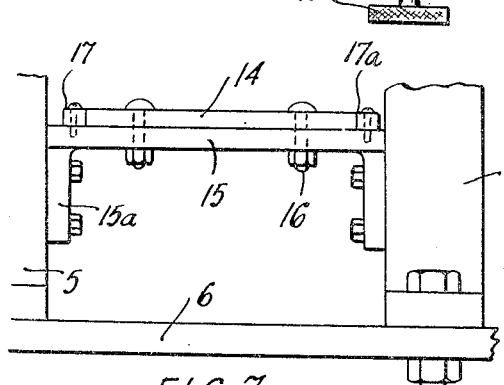
Figure 9:
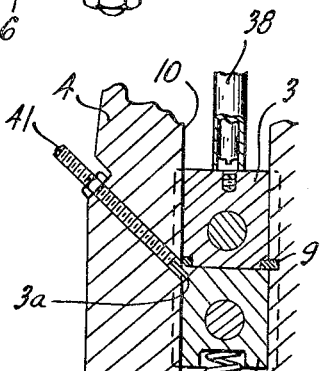
Figure 8:
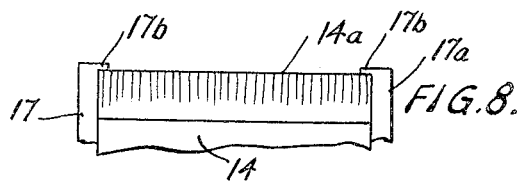

In describing the invention, reference will be made to the accompanying drawings in which:

Figure 1 is an elevation of the machine,

Figure 2 is a plan view of Fig. 1 with a bearing in section to show separation of two shafts both supported by such bearing, Figure 3 is a side elevation of the machine, Figure 4 is a sectional plan view of the plunger bracket, Figure 5 is an enlarged partially sectioned elevation of one of the plungers, Figure 6 is a sectional side elevation on line A—B of Fig. 1, Figure 7 is a partial rear elevation of the machine to show the cutter or knife supporting bracket, Figure 8 is a partial plan view of the cutting edge of the knife and the guide-stops thereof and Figure 9 is a partial sectional end elevation through the bearings or blocks of the rollers.

In the invention, the apparatus comprises a pair of horizontal rollers 1 and 2 disposed one above the other and rotatably carried by bearing blocks 3 at their opposite ends which blocks 3 are vertically slidable within two vertical side frames 4 and 5 which are rigidly secured to extend up from a bedplate 6, the opposite shaft ends 1a and 2a of the rollers 1 and 2 respectively extending through such bearings 3 having pinions 7 secured thereon which mesh continuously, one shaft end 2a being of sufficient length to receive a driving pulley or the like 8 whereby power drive can be imparted to the rollers 1 and 2 from any suitable source of power, this all being known apparatus.

The lower roller 2 is adapted for vertical movement up to a required limit by its bearing blocks 3 engaging stops 9 which are secured to project from the guide faces 10 of the frames 4 and 5 (see Fig. 9) compression springs 11 being disposed between such bearing blocks 3 of the lower roller 2 and the caps 12 (see Fig. 3) on the top ends of adjustment screws 13 which screw through the bedplate 6.

The top level of the lower roller 2 substantially coincides with the level of the sharp cutting edge 14a of a cutter blade or knife 14, this being directed to between the two rollers 1 and 2 (see Figs. 6, 7 and 8) and extending horizontally along the working length of said rollers behind same, this knife 14 being adjustably and removable mounted to a supporting bracket 15 which has angular ends 15a by which it is secured to and between the two side frames 4 and 5, the knife 14 having slotted holes 14b therein through which bolts 16 pass in securing same to the bracket 15, guide bars 17 and 17a being also secured to the bracket 15 to bear against the sides of the knife 14, such guide bars 17 and 17a having right angle ends or stops 17b (see Fig. 8) up to which the cutting edge 14a is placed.

A horizontal gauging platform or table 18 extends along the front of the machine between the two side frames 4 and 5 and to slightly beyond the frame 4 and inward towards the rollers 1 and 2, the top surface 18a being substantially level with the cutting edge 14a of the knife 14, such table 18 being secured to the frames 4 and 5 as by an angle bar 19 secured to same, there being a protecting bar 20 (see Figs. 1 and 6)

secured on the table 18 parallel with and close to the roller 1, such protecting bar 20 being so secured at its ends as to present a feeding gap 21 between same and the table 18 through which the layers or lifts are passed into the rollers 1 and 2, this protecting bar 20 not being essential but desirable so as to protect the fingers of the operator from being drawn into the rollers 1 and 2.

Mounted on the frame 4 above an end portion of the gauging platform and table 18 there is a plunger bracket 22 (see Figs. 3 and 4) this being composed of two side plates 22a and 22b which are secured to opposite sides of the frame 4 and extend horizontally out therefrom, a block 22c being secured to between the outer ends of the side plates 22a and 22b, there being two vertical plunger holes 22d formed in the block and plates for slidably receiving two vertical gauging plungers 23 and 23a.

These gauging plungers 23 and 23a (see Fig. 5) are preferably of square cross section, each having holes 23b concentrically in their top ends and threaded holes 23c at their bottom ends, gauging blocks 24 having pins 24a at their lower ends which fit into the holes 23b whereby the gauging blocks 24 are removably secured to the tops of the gauging plungers 23 and 23a, while adjustment bolts or setscrews 25 screw into the bottom threaded holes 23c of the plungers 23 and 23a.

Below the heads 25a of each of the adjustment bolts 25, reduced continuations thereof form rivet portions 25b by which engaging heads 26 are secured in such manner as to be capable of limited rocking with rotation over such rivet portion 25b, locknuts 27 on the adjustment bolts 25 apart from their normal locking functions also clamping the inner ends of spring plates 28 to the plungers 23 and 23a, there being tension springs 29 between the outer ends of such spring plates 28 and upper spring plates 30 which are secured to the two side plates 22a and 22b.

Directly above the gauging blocks 24 on the tops of the gauging plungers 23 and 23a there are the outer ends of rocker arms 31 and 32, the rocker arm 31 extending from a boss 31a which is secured to a short shaft 33 which is rotatably carried by the two spaced apart bearings 34a of a bearing bracket 34 which is secured to the top of the frame 4, the boss 31a also having a lever arm 31b secured thereto which extends rearward to over the vertical centre line of the frame 4.

The rocker arm 32 is secured to an end of a long shaft 35 which is carried at one end by the bearing 36a of a further and similar bearing bracket 36 secured to the top of the frame 5, the other end of this long shaft 35 being carried by the inner bearing 34a of the bearing bracket 34 on the frame 4, which bearing also carries the inner end of the short shaft 33 as shown in the section of Fig. 2.

A lever arm 37 is secured to the long shaft 35 at a point between the bearings 36a of the bracket 36 and extends rearward to over the vertical centre line of the frame 5.

The lever arms 31b and 37 which extend rearward to over the frames 4 and 5 respectively, pass to directly above the top ends of vertical push rods 38 and 38a which at their top ends are vertically slidable through holes in the bearing brackets 34 and 36, these push rods 38 and 38a being preferably tubular with caps 38b (see Fig. 6) fitted to their top ends, while their bottom ends engage over the heads of setscrews 39 which are secured in the tops of the bearing blocks 3 of the upper roller 1.

For contact purposes, the rocker arms 31 and 32 and the lever arms 31b and 37 having integral or rigidly secured cylindrical contacts 40, and for height adjustment of the lower roller 2 there are adjustment screws 41 and 41a which screw at an angle into the rear sides of the frames 4 and 5 (see Fig. 9) so as to make contact with flats 3a at the top corners of the bearing blocks 3, there being flanges 3b at the inner ends of the bearing blocks 3 the contact faces of which are suitably rounded so as to enable some degree of tilting of the blocks 3.

The surfaces of the rollers 1 and 2 may be ribbed, fluted or the like in known manner for the purpose of achieving grip on the layers or lifts passed therethrough.

In use or operation, it is important that the power drive to the rollers 1 and 2 be such as will not exercise any appreciable influence on same tending to cause them to be raised or lowered, and therefore the belt drive over the pulley 8 will approach same horizontally and preferably from the rear of the machine.

It will be understood that for various thicknesses of heel to be produced there will be various pairs of the gauging blocks 24, a pair of the gauging blocks 24 being fitted (one on top of each plunger 23 and 23a) for a particular desired thickness of heel, so that with the machine in normal position ready for use and it being desired to produce the heels of say three quarters of an inch thickness, the distance between the bottoms of the engaging heads 26 and the surface 18a of the gauging platform and table 18 will be three quarters of an inch.

Several of the layers of lifts from which the heel is to be constructed are placed on top of each other and are placed on the table 18 under the plungers 23 and 23a and if they will go under same, a further lift is taken and is put through the feed gap 21 under the protecting bar 20 into the rotating rollers 1 and 2 from the front of the machine.

If the layers or lifts will not go under the engaging heads 26 of the two plungers 23 and 23a, the top layer is removed and is placed into the rollers 1 and 2, the other layers being left on the table 18 below the plungers 23 and 23a.

With the rollers 1 and 2 normally closed together and presenting substantially no gap between same, for this final or top layer to be able to enter the rollers 1 and 2, the latter must move apart, there being appreciable resistance to the lower roller 2 moving downward because of the strong compression springs 11 resisting such movement, but the upper roller 1 is free to lift but only to the extent as permitted by downward movements of the plungers 23 and 23a.

Accordingly, the upper roller 1 lifts and in doing so causes its bearings or blocks 3 to move the push rods 38 and 38a upward, this causing them to move the respective lever arms 31b and 37 upward and the rocker arms 31 and 32 downward so that the two plungers 23 and 23a are also moved downward until their engaging heads 26 press on top of the layers on the table at opposite sides thereof and thereby stop any further lifting of the top roller 1.

For passage of the final layer through the rollers 1 and 2, the gap presented between such rollers 1 and 2 may not be sufficient, and therefore the upper roller 1 not being able to lift any further, the lower roller 2 is forced to move downward against the resistance to such movement as imposed by the compression springs 11, the amount such lower roller 2 moves down being determined by the amount of the layer which will be sliced off, because in passing through the rollers 1 and 2 the layer encounters the sharp edge 14a of the knife 14 directly to the rear thereof so that the layer is split, the upper piece being the final layer which, along with those on the table 18 under the plungers 23 and 23a will add up to the desired gauged total thickness of heel, the lower piece which has been sliced off being used in the building of the next heel, if suitable.

If the layers or lifts of leather were all in themselves true as to thickness all the time, the rollers 1 and 2 would remain parallel to each other all the time, but in actual practice it is found that layers taper in thickness from side to side, so that with several of such layers placed on top of each other, the total difference in thickness between one side and the other may be appreciable but as the heel must be substantially uniform in depth at its opposite sides, the final layer produced may require to be thicker at one side than at the other to make up for the deficiency at one side and to also make up the balance of thickness required to produce the total heel thickness.

Therefore in such case, when the engaging heads 26 of the two plungers 23 and 23a bear down on the layers on the table 18, one plunger will be higher than the other if the total thickness of the layers is different at opposite sides, this difference in the height of the plungers 23 and 23a having the effect of causing one end of the upper roller 1 to rise to a greater height than the other end thereof, thereby causing the final layer to be cut tapered from side to side.

While the final layer is passing through the rollers 1 and 2, the plungers 23 and 23a press down hard on the layers on the table 18, but as soon as the final layer has passed through the rollers 1 and 2, said rollers return to normal position and the plungers 23 and 23a are lifted by their tension springs 29 and thus release their downward pressure on the layers on the table 18, these layers being removed and the final layer placed on top of same, the layers having collectively reached the gauged thickness to be then passed on for the further known steps in heel production whereby they become secured to each other, the machine being ready for the building of the next heel.

When other thicknesses of heel are to be produced, it is merely necessary to pull down the plungers 23 and 23a against the resistance to such movement as imposed by the tension springs 29, to then lift off the pair of gauge blocks 24 from the tops of the plungers 23 and 23a and to fit the other gauge blocks in accordance with the different depth of heel to be produced, and when intermediate thicknesses of heel or other adjustments are desired, the adjustment bolts 25 at the bottoms of the plungers 23 and 23a are screwed in or out as required and re-locked by the lock nuts 27.

The guide bars 17 and 17a secured to the supporting bracket 15 ensure that the knife 14 on removal for sharpening purposes, is returned to true position with the ends of its cutting edge 14a bearing against the stops 17b of such guide bars 17 and 17a, the adjustment screws 41 and 41a enabling fine adjustment of the level of the top of the bottom roller 2 with that of the cutting edge 14a.

As micrometer accuracy in the thickness of heels is not essential, the machine as shown is sufficiently accurate, but if so desired, such machine could be modified by extending the length of the lever arm 37 with possible shortening of the rocker arm 32 to enable angular lift of the upper roller 1 to be proportional with the angle assumed by plungers when bearing down on the tapering layers.

I claim:

1. Automatic heel building apparatus comprising a pair of rollers with drive means for rotating same, frame means with movable bearings therein for rotatably carrying such rollers, knife means mounted at one side of the pair of rollers, gauging platform and table means, spring means for yieldingly forcing one roller towards the other, a pair of plungers slidably movable towards and away from the gauging platform and table means and mounted in plunger bracket means, means for yieldingly holding the plungers away from said gauging platform and table means and means between the other roller and the plungers whereby movements of opposite ends of such roller are imparted to the plungers.

2. Automatic heel building apparatus as claimed in claim 1 wherein the pair of rollers with drive means for rotating same comprise a pair of horizontal rollers of which one is disposed above the other, with shaft ends of such rollers having pinions thereon which mesh, one shaft end being extended for receiving a power drive.

3. Automatic heel building apparatus as claimed in claim 1 wherein the frame means with movable bearings therein for rotatably carrying the rollers comprise vertical side frames rigidly secured to extend up from a bedplate, vertical guide faces to said frames, bearing blocks vertically slidable between the guide faces of said frames and rotatably carrying the shaft ends of the rollers, flanges to said bearing blocks the contacts faces of which are rounded, stops to the side frames against which the bearing blocks rest and flats on the lower roller bearing blocks for engagement by adjustment screws which screw through the frames.

4. Automatic heel building apparatus as claimed in claim 1 wherein the knife means mounted at one side of the pair of rollers comprises a cutter blade or knife behind the rollers the sharp cutting edge of which is horizontally directed to between the said two rollers, such knife having slotted holes through which bolts pass to secure same to a rigidly secured bracket, guide bars being also secured to said supporting bracket against which the sides of the knife bear, with stops to such guides against which the sharp edge of the knife bears.

5. Automatic heel building apparatus as claimed in claim 1 wherein the gauging platform and table means comprise a horizontal table or platform secured to extend along the front of the machine between the frame means and slightly beyond one of same, to also extend inward towards the rollers.

6. Automatic heel building apparatus as claimed in claim 1 wherein the spring means for yieldingly forcing one roller towards the other comprises compression springs disposed between the under surfaces of the bearing blocks of the lower of the pair of rollers and caps on adjustment screws which screw through the bedplate to which the frame means are secured.

7. Automatic heel building apparatus as claimed in claim 1 wherein the pair of plungers slidably movable towards and away from the gauging platform and table means comprise two vertical plungers slidable in bracket means extending from one of the frames, gauging blocks removably secured at the top ends of said plungers and adjustment screws fitted into the bottom ends of the plungers with engaging heads mounted at the bottom ends of said adjustment screws.

8. Automatic heel building apparatus as claimed in claim 1 wherein the plunger bracket means comprise two side plates secured to opposite sides of a frame to extend horizontally out therefrom, a block secured between the outer ends of such side plates and vertical plunger holes formed through said block and plates.

9. Automatic heel building apparatus as claimed in claim 1 wherein the means for yieldingly holding the plungers away from the platform and table means comprise spring plates secured to the bottom ends of the plungers, spring plates secured to the bracket means which slidably carry the plungers and tension springs secured between the plunger and bracket spring plates.

10. Automatic heel building apparatus as claimed in claim 1 wherein the means between the other roller and the plungers whereby movements of opposite ends of such roller are imparted to the plungers comprise, lever arms contacting the outer ends of push rods which at their other ends engage the bearing blocks of said other roller, such lever arms extending from shafts supported by bearing means which are secured to the tops of each frame, rocker arms also secured to each of the shafts extending to above and contacting the gauging blocks at the top ends of the plungers.

11. Automatic heel building apparatus comprising a pair of rollers rotatable in bearing blocks which are vertically slidable within side frames which are rigidly secured to extend up from a bedplate, meshing pinions secured to the shaft ends of the rollers, stops for the bearing blocks in the side frames, adjustment screws for the lower roller bearing blocks and compression springs with adjustment screws for such lower bearing blocks, a knife carried by a bracket which is secured to the side frames and disposed behind the pair of rollers, a gauging platform and table secured to the side frames and disposed to the front of the pair of rollers, a plunger bracket extending from one side frame to above the gauging platform and table, two plungers vertically slidable in said plunger bracket with springs tending to hold them up from the gauging platform and table, rocker arms engaging the top ends of each of the plungers, shafts and lever arms in respect of each of said rocker arms, bearing brackets at the tops of the side frames for carrying said shafts, push rods engaged with the bearing blocks of the upper roller and vertically slidable through holes in the bearing brackets, said push rods being engaged by the said lever arms.

JAMES BRACKENRIDGE MUDGWAY.

No references cited.